US008540110B2

(12) United States Patent
Lukiyanets et al.

(10) Patent No.: US 8,540,110 B2
(45) Date of Patent: Sep. 24, 2013

(54) HIGH-PRESSURE CONTAINER

(75) Inventors: Sergey V. Lukiyanets, Zlicin (CZ); Nikolay G. Moroz, Mizosov (CZ)

(73) Assignee: Armotech S.R.O., Prague (CZ)

( * ) Notice: Subject to any disclaimer, the term of this patent is extended or adjusted under 35 U.S.C. 154(b) by 204 days.

(21) Appl. No.: 13/059,256

(22) PCT Filed: Aug. 26, 2009

(86) PCT No.: PCT/EP2009/006182
§ 371 (c)(1), (2), (4) Date: Mar. 3, 2011

(87) PCT Pub. No.: WO2010/022928
PCT Pub. Date: Mar. 4, 2010

(65) Prior Publication Data
US 2011/0266182 A1 Nov. 3, 2011

(30) Foreign Application Priority Data
Aug. 27, 2008 (RU) ................................ 2008134619

(51) Int. Cl.
*F17C 1/02* (2006.01)
*B65D 81/02* (2006.01)
*B65D 85/30* (2006.01)
*B32B 1/08* (2006.01)
*B32B 27/08* (2006.01)
*B32B 15/08* (2006.01)

(52) U.S. Cl.
USPC ........... 220/586; 220/592; 220/918; 220/919; 220/920; 206/591; 206/592; 206/593; 206/594; 428/35.7; 428/35.8; 428/35.9; 428/36.8

(58) Field of Classification Search
USPC ......... 220/920, 919, 918, 586, 592; 206/594, 206/593, 591, 523; 428/34.1, 35.7–35.9, 428/36.8
See application file for complete search history.

(56) References Cited

U.S. PATENT DOCUMENTS 3,446,385 A * 5/1969 Ponemon ...................... 220/590
3,828,608 A * 8/1974 Yamamoto ......................... 73/37
4,851,286 A * 7/1989 Maurice ..................... 428/316.6
4,964,524 A 10/1990 Halene
5,199,609 A * 4/1993 Ash, Jr. ........................... 222/94
6,145,692 A * 11/2000 Cherevatsky ................. 220/581
6,547,092 B1 4/2003 Chervatsky
6,808,833 B2 * 10/2004 Johnson ........................ 429/443
7,172,825 B2 * 2/2007 Adams et al. ................. 429/443

FOREIGN PATENT DOCUMENTS

WO 2007051432 A 5/2007

* cited by examiner

*Primary Examiner* — Anthony Stashick
*Assistant Examiner* — Jennifer Castriotta
(74) *Attorney, Agent, or Firm* — Andrew Wilford

(57) ABSTRACT

The invention relates to a high-pressure container comprising a thin-walled, cylindrical metal liner (1) having bases (8) on the end sections and an outer stable jacket (2) that surrounds the liner (1). At least one of the bases (8) of the liner (1) has a slight convex curvature towards the interior of the liner (1). A pressure converter (4) is situated between the outer surface of the convex base (8) and the inner surface of a base part of the stable jacket (2), said converter being constructed from a rigid profiled base on the side facing the base part of the rigid jacket (2) and a deformable cushion (6) of viscoelastic material on the side facing the convex base (8).

9 Claims, 2 Drawing Sheets

HIGH-PRESSURE CONTAINER

CROSS REFERENCE TO RELATED APPLICATIONS

This application is the US-national stage of PCT application PCT/EP2009/006182, filed 26 Aug. 2009, published 4 Mar. 2010 as WO2010/022928, and claiming the priority of Russian patent application 2008134619 itself filed 27 Aug. 2008.

FIELD OF THE INVENTION

The present invention relates to a high-pressure container with a thin-walled, cylindrical, metallic liner with end walls and an outer stable jacket, which surrounds the liner. Such high-pressure containers serve to store and transport of fluid media (liquid or gas) under pressure.

BACKGROUND OF THE INVENTION

High-pressure containers are known which are generally exposed to a plurality of load cycles with high pressure. In such containers the material of the sealing jacket, the liner, is particularly significant when it comes to preventing escape of the fluid medium or damage to the seal.

A high-pressure container is known from RU 2094695 C1 which comprises a liner with elongate and annular grooves, which are filled with a resilient material, reinforcing rings and annular reinforcing ribs, which are arranged in the annular grooves on the outside and are displaceable along the ring.

A disadvantage of the known solution lies in the fact that the combination of elongate and annular grooves increases the overall flexural strength of the liner but does not allow the material of the liner and the material of the composite jacket to be simultaneously deformed. Plastic deformation arises in the annular grooves under annular tensile loading and in the axial grooves under axial tensile loading of the liner, when the container is exposed to internal pressure. The introduction of different resilient inserts and additional rigid rings into the indentations of the grooves does not in practice lead to solution of the problem of interest, which is the creation of a highly effective pressure container.

A high-pressure container is known from U.S. Pat. No. 6,547,092 B1 which comprises a thin-walled metallic liner with a set of elongate grooves, wherein the arrangement of reinforcing fibers in the composite jacket is such that the deformation of the composite jacket corresponds to the deformation of the metallic liner. In this case, the grooves in the liner are filled with resilient material, while the liner itself is separated from the composite jacket by an insert of resilient material.

A disadvantage of this solution lies in the fact that exposure to elevated pressures results in deformation of the composite jacket in a predetermined direction, compression and redistribution of the material of the resilient insert and of the material located in the grooves. Because the surface provided with grooves of the liner is not an isometric cylindrical surface of the composite jacket nor a surface concentric thereto, the grooves of the thin-walled liner are arbitrarily deformed, and plastic deformation occurs therein, which leads under multiple load cycles to destruction of the liner.

OBJECT OF THE INVENTION

The object of the present invention is to use structurally simple means to provide a low-weight high-pressure container with a long service life under a large number of load cycles.

SUMMARY OF THE INVENTION

This object is achieved by a high-pressure container which comprises a thin-walled, cylindrical, metallic liner with end walls and an outer stable jacket, which surrounds the liner, wherein at least one of the end walls of the liner is gently curved slightly convexly toward an interior of the liner, and a pressure buffer is arranged between the outer surface of the curved end wall and the inner surface of an end wall of the stable jacket, which pressure buffer takes the form, on the side directed toward the curved end wall, of a deformable cushion of viscoelastic material.

The technical result of the invention is to increase the stability of the container by reducing loading of the liner by expanding forces, reducing the weight of the container and its manufacturing costs and ensuring a long service life relative to the number of load cycles during which the container can be used is safely.

The total volume of viscoelastic material of the disks making up the cushion of the pressure buffer preferably exceeds the increase in interior volume of the stable jacket in the event of deformation in an axial direction.

According to one embodiment of the invention, the shape of the surface of the gently curved end wall of the liner is a cone with an opening angle of between 172° and 179°.

According to another embodiment, the shape of the surface of the gently curved end wall of the liner is segment of a sphere with a maximum height of the segment formed by this segment of a sphere of no more than 0.06 of the radius of the cylindrical liner.

According to a further embodiment, the shape of the surface of the gently curved end wall of the liner is in the form of a combination of conical surfaces and flat rings, the segment of a sphere inscribed in this shape of the surface having a segment height of no more than 0.06 of the radius of the cylinder.

Over the entire contact surface, an ellipsoidal end wall of the outer stable jacket and the base of the pressure buffer may be separated from one another by friction-reducing material.

EMBODIMENTS OF THE INVENTION

Figure 1:
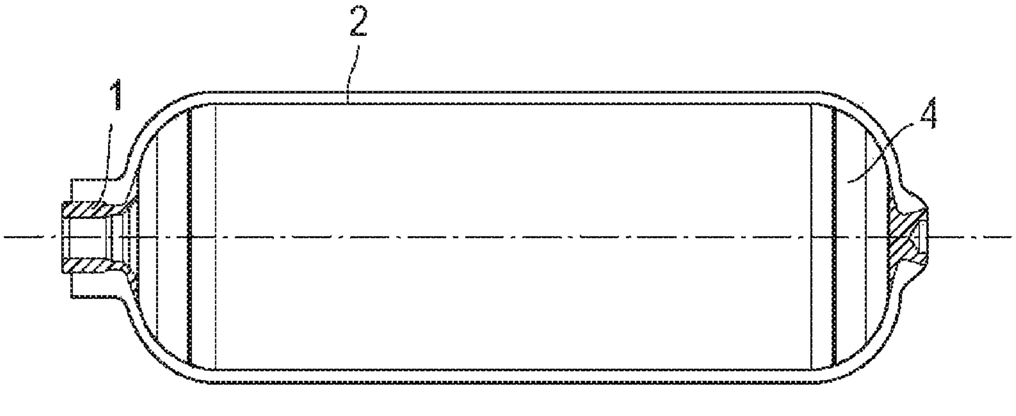
FIG. 1 shows an overall view of a high-pressure container.

The high-pressure container shown in FIG. 1 comprises an outer stable jacket 2 for example of composite material in the form of a multi-ply carcass, the plies of which are achieved by winding intersecting, identically directed fibers of polymer binder-impregnated glass fibre or carbon fibre. The jacket 2 encloses a thin-walled, overall cylindrical liner 1 of metal, which is separated from the composite jacket 2 by an interlayer (not shown) of viscoelastic material. The surface of the liner 1 may comprise longitudinal and/or transverse grooves on the cylindrical portion (not shown in the drawings). When producing the stable jacket 2, a pressure buffer 4 consisting of a rigid profile base 5 and a deformable cushion 6 is arranged between it and the liner 1. The cushion 6 here consists of a set of mutually separated disks 7 of different densities. The use of flexible resilient rubber-type materials of varying density is proposed as the cushion 6 material for each disk.

The mode of operation of this high-pressure container is explained with reference to the following example.

It is known from geometry that two surfaces are described as isometric if one of them may be transformed into the other without the internal metrics being changed, i.e. surfaces which can merge together solely by deformation of the curvature.

Figure 6:
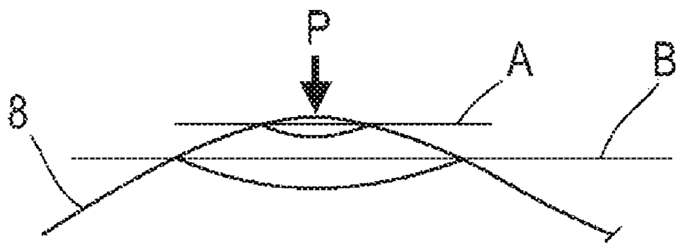
FIG. 6 is a schematic view of the bend of an end wall of a liner.

It is likewise known from mechanics that deformation of the surface of a gently curved jacket proceeds without changing the internal metrics and constitutes geometric flexure, which is achieved by a mirror reflection of part thereof relative to a specific plane, or by successive implementation of a series of such reflections, shown schematically in FIG. 6.

FIG. 6 shows one of the gently curved end faces of the end wall 8 of the liner 1, which initially forms an inwardly curved surface of the liner 1 of a deformable thin-walled material, for example of thin-walled metal. If pressure, designated P, is exerted on the curved inner part of the surface of the end wall 8, the surface of the end wall 8 deforms, causing flexure of the surface, which is achieved by mirror reflection of its original position relative to a plane A, as shown in FIG. 6. An increase in the pressure P leads to further geometric flexure of the surface of the end wall 8 of the liner 1, which results in a deformed portion of the surface with significant flexure, which is achieved by the mirror reflection of this surface in the original position relative to a plane B, as shown in FIG. 6.

This transition of the end wall into a deformed state is isometric and is associated with considerable flexure of the end wall.

Figure 2:
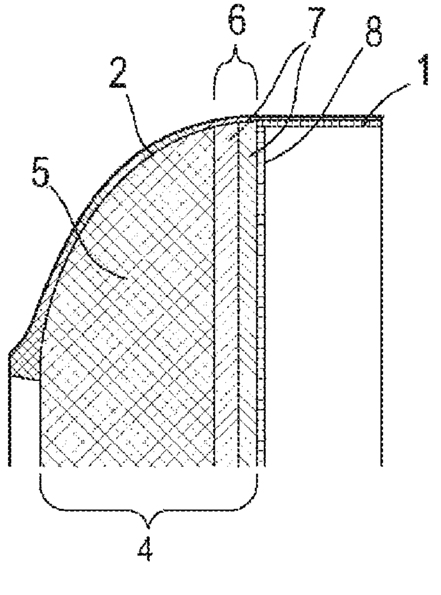
FIG. 2 shows a longitudinal section of a part of the end portion of the high-pressure container shown in FIG. 1.

With the above-mentioned container design at least one of the end walls 8 of the liner 1 is gently curved, its surface in the deformed state being isometric to the surface in the original state. This surface of the end wall 8 of the liner 1 may here be formed of sub-surfaces whose different shape variants are shown in FIGS. 2 to 5. For simplicity's sake FIG. 2 shows the gently curved end face of the end wall 8 of the liner 1 without inward curvature.

A pressure buffer 4 is arranged in the space formed between the gently curved end face of the end wall 8 of the liner 1 and the inner surface of the stable jacket 2. The task of the pressure buffer 4 is to transform the effect of the constant internal pressure on the gently curved end wall 8 of the liner 1 into a movement of the rigid base 5 under the action thereof and the creation of a specific contact pressure on the end wall of the stable jacket 2, which is unevenly distributed over its contact surface with the base 5 of the buffer 4. Such a transformation is effected by the resilient contraction and expansion of the material of the disks 7 of the cushion 6 on deformation thereof.

The dimensions of the disks 7 are selected on the condition that the total volume of their material exceeds the increase in volume of the stable jacket 2 on deformation thereof axially.

The essential details of the mode of operation of the liner 1 in this embodiment are as follows: As a pressure develops in the cavity of the container the gently curved end wall 8 of the liner 1 is deformed without expanding or contracting membrane deformation and ultimately, solely due to bending strain, achieves a shape which is isometric to the initial shape. Compression of the viscoelastic material of the disks 7 then takes place, and as a result of its incompressibility the pressure is transmitted via the entire surface of the end wall 8 to the rigid base 5 and through this to the end wall of the stable jacket 2, wherein it is distributed thereover in the form of a contact pressure of uneven profile, the viscoelastic material being virtually incompressible in terms of a reduction in its volume. The stable jacket 2 is also deformed and enlarges the internal volume enclosed thereby. At the same time, the material of the disks 7 is deformed axially and expands into the spaces which arise as a result of deformation of the stable jacket 2. Because the total volume of the material of the disks 7 is greater than the increase in volume on deformation of the stable jacket 2, the flexure of the gently curved end wall 8 of the liner 1 does not, however, achieve the final isometric shape. The axial forces which arise as a result of the internal pressure in the container are only absorbed by the material of the stable jacket 2. No axial expanding forces arise in this respect in the material of the liner 1. The load is transmitted by the base 5 of the pressure buffer 4 as contact pressure between the base 5 and the stable jacket 2 to the material of the stable jacket 2, and the base 5 acts as a rigid whole and undergoes virtually no deformation under the pressure applied. The profile of the end wall of the stable jacket 2 of the container must be selected, on condition of uniform loading of the material, within the limits of the shape of the base 5.

Thus, because the liner 1 does not absorb any axial forces, its wall thickness and the material may be selected on the basis of conditions which are not associated with the deformation of the container on internal pressure in the radial direction. This makes it possible to combine an embodiment of the liner with longitudinal grooves with the stated technical solution and thereby to rule out to a considerable extent loading of the liner by expanding forces, which makes it possible to reduce the weight of the liner and its production costs. In this respect it is also possible to use relatively inexpensive components for the material of the stable jacket, for example glass fibre-reinforced plastics.

The geometry of the surface of the gently curved end wall 8 of the liner 1 is selected as explained in the following example.

As shown above, the basic condition of the action of the end wall 8 of the liner 1 is that the material of the end wall 8 of the liner 1 is not stretched. Deformation may only arise through isometric flexure. Taking account of the given limit and the second condition that the bending strain must not exceed the level of the resilient deformation in the material of the liner 1 (for metals and their alloys: 0.2%), the specific relationships between the shape and the depth of the inward flexure of the gently curved end wall 8 of the liner 1 are determined. It is in particular proposed to use three types of shape: a conical shape, a segment of a sphere and a combination of conical shapes and faces.

A solution is possible as an embodiment of the end wall 8 of the liner 1 in which one part of the end wall 8 is formed as a flat membrane and one part is formed as a cone and/or segment of a sphere.

Figure 3:
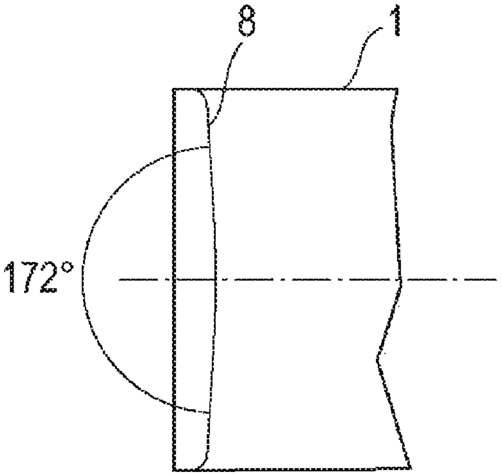
FIG. 3 is a sectional schematic view of a conical end wall of a liner.
Figure 4:
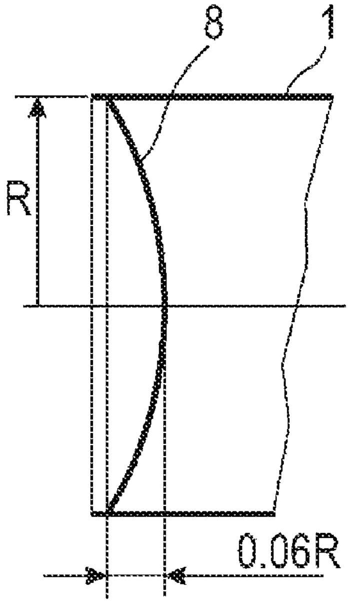
FIG. 4 is a sectional schematic view of an end wall of a liner in the form of a segment of a sphere.

FIG. 3 shows an embodiment of the container with a liner 1, in which the shape of the surface of its gently curved end wall 8 is formed as a cone with an opening angle of 172°, the tip of which is directed toward the inside of the liner 1. Preferably, the opening angle of the cone is at least 172° in magnitude. FIG. 4 shows an embodiment of the surface of a gently curved end wall 8 of a liner 1 in the form of a segment of a sphere, which curves toward the interior of the liner 1, wherein the maximum height of the segment of the sphere amounts to 0.06 of the radius of the cylindrical portion of the liner 1. The height of the segment of the sphere preferably does not exceed 6% of the radius of the cylindrical portion of the liner 1. Only on this condition is deformation of the flexure of the surface of the gently curved end wall 8 possible without any change to internal metrics.

Figure 5:
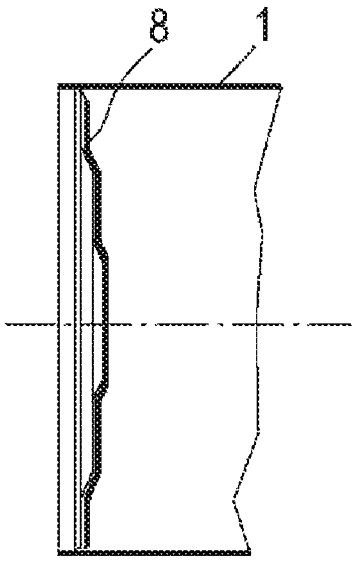
FIG. 5 is a sectional schematic view of an end wall of a liner in the form of a combination of conical surfaces and flat rings.

FIG. 5 is a sectional view of the surface of a gently curved end wall 8 of a liner 1, which is formed of a combination of conical surfaces and flat rings, wherein the width of the individual rings and the parameters of the individual conical is surfaces are matched to one another in such a way that it is possible to inscribe in this surface shape a segment of a sphere which has the parameters of the segment of a sphere illustrated in FIG. 4.

The mode of operation of the high-pressure container consists in its being filled up to the necessary pressure level with a fluid medium (liquid or gas), stored, transported, emptied and then refilled, the fluid medium being consumed, i.e. it consists of a series of actions and steps with multiple load cycles.

The creation of the proposed device results in the real possibility of using high-pressure containers of composite material having a thin-walled metallic inner jacket. Production and testing of high-pressure containers with the proposed liner for sealing thereof confirmed the high reliability and effectiveness thereof.

INDUSTRIAL APPLICABILITY

The invention may be used in portable oxygen respirators for mountaineers and rescue workers, in mobile refrigeration and fire protection products, in gas supply systems and in automotive engineering.

The invention claimed is:

1. A high-pressure container comprising:

a thin-walled, cylindrical, metallic liner with end walls;

an outer stable jacket surrounding the liner, at least one of the end walls of the liner being curved gently with slight convexity as a segment of a sphere toward an interior of the liner, a maximum height of the spherical segment being no more than 0.06 of a radius of the cylindrical liner; and a pressure buffer between the outer surface of the curved end wall and the inner surface of an end wall of the stable jacket, the pressure buffer being formed on the side directed toward the end wall of the stable jacket as a rigid profile base and, on the side directed toward the curved end wall, as a deformable cushion of viscoelastic material.

2. The container according to claim 1, wherein the liner is a corrugated liner is covered from outside with viscoelastic material, the outer stable jacket being engaged over the viscoelastic material of the liner.

3. The container according to claim 1, wherein the deformable cushion is formed from at least two disks of viscoelastic material of different densities.

4. The container according to claim 1, wherein the viscoelastic material is virtually incompressible in terms of a reduction in volume.

5. The container according to claim 1, wherein the total volume of the cushion of the pressure buffer exceeds the increase in the internal volume of the stable jacket axially on deformation thereof.

6. The container according to claim 1, wherein the surface of the gently curved end wall of the liner is shaped as a cone with an apex angle of at least 172° and having a tip pointed directed toward the interior of the liner.

7. The container according to claim 1, wherein the surface of the gently curved end wall of the liner is shaped as a combination of conical surfaces and flat rings.

8. The container according to claim 1, wherein the end wall of the outer stable jacket and the base of the pressure buffer are separated from one another over the entire contact surface by friction-reducing material.

9. The container according to claim 1, wherein at least one end wall of the outer stable jacket is ellipsoidal in shape.

* * * * *